United States Patent
Ha et al.

(10) Patent No.: US 7,964,302 B2
(45) Date of Patent: Jun. 21, 2011

(54) PROCESS FOR PREPARATION OF SECONDARY BATTERY MODULE

(75) Inventors: Jin Woong Ha, Cheonan-si (KR); Jeeho Kim, Daejeon (KR); HanHo Lee, Daejeon (KR)

(73) Assignee: LG Chem, Ltd. (KR)

( * ) Notice: Subject to any disclaimer, the term of this patent is extended or adjusted under 35 U.S.C. 154(b) by 900 days.

(21) Appl. No.: 11/317,352

(22) Filed: Dec. 23, 2005

(65) Prior Publication Data

US 2006/0162149 A1  Jul. 27, 2006

(30) Foreign Application Priority Data

Dec. 24, 2004 (KR) .................. 10-2004-0112592

(51) Int. Cl.
*H01M 2/16* (2006.01)
*H01M 10/00* (2006.01)
*H01M 6/46* (2006.01)

(52) U.S. Cl. ........ 429/142; 429/122; 429/146; 429/148; 429/153; 429/162

(58) Field of Classification Search .................. 429/152
See application file for complete search history.

(56) References Cited

U.S. PATENT DOCUMENTS

| | | | |
|---|---|---|---|
| 4,396,689 A | | 8/1983 | Grimes et al. |
| 5,326,655 A | * | 7/1994 | Mix et al. ....................... 429/178 |
| 5,364,711 A | | 11/1994 | Yamada et al. |
| 5,487,955 A | | 1/1996 | Korall et al. |
| 5,547,775 A | * | 8/1996 | Eguchi et al. .................. 320/118 |
| 5,592,094 A | * | 1/1997 | Ichikawa ....................... 324/427 |
| 5,652,043 A | * | 7/1997 | Nitzan ........................... 428/209 |
| 6,232,013 B1 | * | 5/2001 | Clarke et al. ................... 429/100 |
| 6,296,967 B1 | * | 10/2001 | Jacobs et al. ..................... 429/93 |
| 2003/0071711 A1 | * | 4/2003 | Haupt et al. ................... 337/159 |
| 2005/0123828 A1 | * | 6/2005 | Oogami et al. ................ 429/152 |

FOREIGN PATENT DOCUMENTS

| | | |
|---|---|---|
| JP | 11-233097 | 8/1999 |
| JP | 2004-63278 | 2/2004 |
| JP | 2005-116436 | 4/2005 |
| KR | 1020040045937 | 6/2004 |
| KR | 1020040081327 | 9/2004 |

* cited by examiner

*Primary Examiner* — Dah-Wei D Yuan
*Assistant Examiner* — Kwang Han
(74) *Attorney, Agent, or Firm* — Cantor Colburn LLP

(57) ABSTRACT

Disclosed herein is a process for preparation of a secondary battery module. The process includes forming coupling through-holes having specific shapes at plate-shaped electrode terminals of a plurality of unit cells, stacking the unit cells one on another, and inserting coupling members through the coupling through-holes to couple the unit cells with each other. Consequently, the secure coupling and the electrical connection between the unit cells is accomplished without using additional members, such as cartridges, and therefore, a compact battery module having high coupling force is prepared.

9 Claims, 4 Drawing Sheets

PROCESS FOR PREPARATION OF SECONDARY BATTERY MODULE

FIELD OF THE INVENTION

The present invention relates to a process for preparation of a high-output, large-capacity secondary battery module or pack, and, more particularly, to a process for preparation of a secondary battery module that is capable of accomplishing the secure coupling and the electrical connection between unit cells by forming coupling through-holes having specific shapes at electrode taps of the unit cells and inserting coupling members through the coupling through-holes. The present invention also relates to a secondary battery module prepared using the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel. As a result, kinds of applications using the secondary battery are being increased owing to advantages of the secondary battery, and hereafter the secondary battery is expected to be applied to more applications and products than now.

As kinds of applications and products, to which the secondary battery is applicable, are increased, kinds of batteries are also increased such that the batteries can provide outputs and capacities corresponding to the various applications and products. Furthermore, there is a strong need to reduce the sizes and weights of the batteries applied to the corresponding applications and products.

For example, small-sized mobile devices, such as mobile phones, personal digital assistants (PDAs), digital cameras, and laptop computers, use one or several small-sized, light cells for each device according to the reduction in size and weight of the corresponding products. On the other hand, medium- or large-sized devices, such as electric bicycles, electric vehicles, and hybrid electric vehicles, use a battery module (or battery pack) having a plurality of cells electrically connected with each other because high output and large capacity is necessary for the medium- or large-sized devices. The size and weight of the battery module is directly related to the receiving space and output of the corresponding medium- or large-sized device. For this reason, battery manufacturers are trying to manufacture small-sized, light battery modules. Furthermore, devices, which are subject to a large number of external impacts and vibrations, such as electric bicycles and electric vehicles, require stable electrical connection and physical connection between components constituting the battery module. In addition, a plurality of cells are used to accomplish high output and large capacity, and therefore, the safety of the battery module is regarded as important.

Generally, a medium- or large-sized battery module is prepared by mounting a plurality of unit cells in a case (housing) having a predetermined size and electrically connecting the unit cells. Rectangular secondary cells or pouch-shaped secondary cells, which can be stacked with high integration, are used as the unit cells. Preferably, the pouch-shaped cells are used as the unit cells, since the pouch-shaped cells are light and inexpensive.

FIG. 1 is a typical plan view illustrating a conventional pouch-shaped cell 100. Referring to FIG. 1, the pouch-shaped cell 100 includes an electrode assembly (not shown), which comprises a cathode, a separation film, and an anode, mounted together with an electrolyte in a sealed pouch-shaped case 110, which is made of an aluminum laminate sheet. From the electrode assembly extends electrode taps, which protrude from the upper end of the cell to constitute plate-shaped electrode terminals 120 and 130. Alternatively, the plate-shaped electrode terminals 120 and 130 may be constituted by electrode leads attached to the electrode taps, which protrude from the upper end of the cell.

However, several problems are raised when preparing a battery module using the above-described cell as the unit cell.

Specifically, the mechanical strength of the cell sheath (case) is lower, and therefore, it is difficult to prepare a structurally strong battery module using a plurality of such cells. Also, the cell itself does not include a structure for coupling the cells to each other, and therefore, an additional coupling member is necessary to prepare the battery module.

In the conventional art, cells are mounted in a cartridge, which is capable of receiving one to three cells, a plurality of cartridges are stacked (piled) one on another, and the stacked cartridges are mounted in a module case to prepare a battery module. In other words, the plurality of cartridges and the module case are used to prepare the battery module including the plurality of cells. Consequently, the size of the battery module is increased, and a process for preparation of the battery module is complicated.

Also, it is difficult to electrically connect the plate-shaped electrode terminals in series or in parallel with each other. Consequently, a process for electrical connection between the electrode terminals is also complicated. Generally, the electrode terminals are connected with each other using wires, plates, or bus bars by welding. For this reason, the plate-shaped electrode terminals are partially bent, and the plates or the bus bars are connected to the bent parts of the plate-shaped electrode terminals by welding, which requires skilled techniques. Also, this connecting process is very complicated. In addition, the connected parts may separate from each other due to external impacts, which results in increase in the number of defective products.

SUMMARY OF THE INVENTION

Accordingly, it is an object of the present invention to substantially obviate the above-mentioned problems of the conventional arts as well as the technical problems requested from the past.

The inventors have performed various experiments and research on a process for preparation of a battery module, and have found that, when coupling through-holes having specific shapes are formed at electrode terminals protruding from cell bodies of unit cells constituting the battery module, and coupling members are inserted through the coupling through-holes, the battery module can be prepared while the plurality of unit cells are securely coupled with each other in the battery module without using conventional cartridges, and the electrode terminals of the unit cells, which are stacked one on another to prepare the battery module, are uniformly arranged in the same orientation, by which the electrical connection between the stacked unit cells is easily accomplished.

In accordance with one aspect of the present invention, the above and other objects can be accomplished by the provision of a process for preparation of a high-output, large-capacity secondary battery module or pack having a plurality of unit cells stacked one on another and electrically connected with each other, comprising the steps of: forming coupling through-holes at plate-shaped electrode terminals of a plurality of unit cells; stacking the unit cells one on another such that the electrode terminals are arranged in the same orientation; and inserting coupling members through the coupling through-holes to couple the unit cells with each other, wherein each of the coupling through-holes is located within a critical imaginary area defined by a width corresponding to 80% of the width of the corresponding electrode terminal and a height corresponding to 80% of the height of the corresponding electrode terminal, and the separation distance between the outermost boundary line of each of the through-holes and at least one of the outer edges of each of the electrode terminals is 3 mm or more.

The plate-shaped electrode terminals are recognized to have low mechanical strength. For this reason, the plate-shaped electrode terminals are not generally used as direct coupling devices for coupling the unit cells. That is to say, as previously described, it is general that cells are mounted in a cartridge, and a plurality of cartridges are connected with each other to prepare a battery module. In a preferred embodiment of the present invention, however, the plate-shaped electrode terminals, at which the through-holes having the above-mentioned specific shapes are formed, are directly used to connect the cells.

Unit cells usable in the present invention are not particularly restricted so long as the unit cells are chargeable and dischargeable secondary cells having plate-shaped electrode terminals. For example, lithium secondary cells, nickel-metal hydride (Ni-MH) cells, or nickel-cadmium (Ni—Cd) cells may be used as the unit cells. Preferably, the lithium secondary cells are used as the unit cells, since the lithium secondary cells provide high output to weight ratio. Base on their shapes, the lithium secondary cells are classified into cylindrical cells, rectangular cells, and pouch-shaped cells. Preferably, the rectangular cells and the pouch-shaped cells, which can be stacked in high integration, are used as the unit cells. More preferably, the pouch-shaped cells, the weight of which is small, are used as the unit cells.

The electrode terminals may be constructed such that the cathode terminal and the anode terminal are formed at one side of each cell, or the cathode terminal is formed at one side of each cell while the anode terminal is formed at the other side of each cell. For example, the cathode terminal and the anode terminal may be formed at the upper end and the lower end of each cell, respectively, such that the cathode terminal and the anode terminal are opposite to each other.

The electrode terminals may be made of a conductive material for accomplishing electrical conduction due to electrochemical reaction of the electrode assembly, such as aluminum, copper, nickel, or an alloy thereof.

Each electrode terminal having the through-hole formed therein is needed to have a size satisfying the above-defined conditions. When the size of the electrode terminal is too small, the electrode terminal cannot have mechanical strength sufficient to be used as a member for coupling (coupling element), and it is difficult to form the through-hole in the electrode terminal. Also, the space of the electrode terminal necessary to accomplishing the electrical connection in series or in parallel between the electrode terminal and a neighboring electrode terminal is reduced after the through-hole is formed in the electrode terminal, and the resistance value of the electrode terminal is increased. Consequently, the small-sized electrode terminal is not preferable.

A large amount of external force may be applied to the battery module depending upon kinds of external devices, to which the battery module is applied. Such external force is transmitted to the coupling elements inside the battery module. For this reason, when the electrode terminals are used as the coupling elements, the electrode terminals are needed to have mechanical strength sufficient to withstand impacts and vibrations applied to the external device, in which the battery module is mounted. Typically, the through-hole is formed at the plate-shaped electrode terminal by drilling. When the thickness of the electrode terminal is less than the above-specified limit, however, the electrode terminal is soft, and therefore, it is difficult to smoothly form the through-hole without burrs in the electrode terminal. Also, the electrode terminal is used not only as the above-mentioned coupling element for accomplishing secure coupling between the unit cells but also as a connecting element for accomplishing the electrical connection between the unit cells. When the size of the electrode terminal is less than the above-specified limit, however, the electrode terminal cannot have a sufficient space required to serve as the connecting element after the through-hole is formed in the electrode terminal, and the electrical resistance value of the electrode terminal is increased.

According to the present invention, the through-hole is formed in the above-defined critical area of the electrode terminal. The critical area of the electrode terminal, in which the through-hole is formed, is a rectangular imaginary area defined by the width corresponding to 80% of the width of the electrode terminal and the height corresponding to 80% of the height of the electrode terminal. The separation distance between the outermost boundary line of the through-hole formed in the imaginary area and at least one of the outer edges of the electrode terminal is 3 mm or more. Preferably, one through-hole is formed in the critical area of the electrode terminal, although two or more through-holes may be formed in the critical area of the electrode terminal. The size and location of the rectangular imaginary area is defined in consideration of the mechanical strength of the electrode terminal as the coupling element, ease of drilling performed to form the through-hole, and the allowable area of the electrode terminal as the electrical connecting member.

For example, when the separation distance between the rectangular imaginary area and the outer edges of the electrode terminal is below 20% of the width of the electrode terminal or the height of the electrode terminal, or the separation distance between the outermost boundary line of the through-hole and at least one of the outer edges of the electrode terminal is below 3 mm, the electrode terminal cannot have mechanical strength required to serve as the coupling element, it is difficult to form the through-hole in the electrode terminal, the contact area of the electrode terminal as the electrical connecting member is too small, and the electrical resistance value of the electrode terminal is excessively increased.

The reason to define the separation distance between the outermost boundary line of the through-hole and the at least one of the outer edges of the electrode terminal is that the through-holes may be at least partially opened toward the outer edges of the corresponding electrode terminal. In this structure, the coupling member may be inserted in the through-hole through the opened side of the through-hole. Consequently, this structure must be interpreted to be within the scope of the present invention.

The area of the through-hole may be set based on various factors. Preferably, the area of the through-hole is less than 60% of that of the electrode terminal. More preferably, the area of the through-hole is less than 40% of that of the electrode terminal. The above-specified area of the through-hole allows the electrode terminal to have mechanical strength suitable to serve as the coupling element. Also, the above-specified area of the through-hole allows the electrode terminal to have large contact area when the electrode terminal is coupled or welded to the connecting element to accomplish the electrical connection between the electrode terminals, whereby the resistance value of the electrode terminal is reduced to a desired level.

The through-hole may be formed in various shapes. Preferably, the through-hole is formed in the shape of a circle or an oval, the outermost boundary surface of which is closed, although the shape of the through-hole is not limited to the circle or the oval.

In a preferred embodiment of the present invention, the battery module includes: an insulating member mounted between the electrode terminals of the neighboring unit cells for maintaining the electrical insulation between the electrode terminals, the insulating member having coupling protrusions, which are fitted in the though-holes; and a connecting member coupled to the insulating member for electrically connecting the electrode terminals of the unit cells coupled to the insulating member in series or in parallel with each other.

In this case, the insulating member also serves to interconnect the electrode terminals through the coupling protrusions. Preferably, the coupling protrusions are also provided with through-holes having an inner diameter less than that of the through-holes of the electrode terminals. The unit cells are stacked one on another while the insulating member is disposed between the neighboring unit cells, and then the coupling members are inserted through the through-holes of the coupling protrusions, whereby the unit cells are coupled with each other.

In accordance with another aspect of the present invention, there is provided a battery module prepared using the above-described process. In the battery module according to the present invention, the secure coupling and the electrical connection between the unit cells are accomplished without using cartridges. Consequently, the structure of the battery module is compact.

In a preferred embodiment of the present invention, the battery module comprises: a plate, on which a plurality of unit cells, which are chargeable and dischargeable secondary cells, are stacked one on another; and circuit units for controlling the operation of the battery.

The plate is not particularly restricted so long as the plate has a structure in which the unit cells can be stacked one on another. The plate may be a case having a receiving part corresponding to the size of the unit cells such that the unit cells can be easily mounted in the receiving part. Preferably, the case is constructed in a separated structure in which the upper and lower parts of the stacked unit cells are covered by the case.

The battery module according to the present invention may be utilized in various applications. For example, the battery module may be used as a power source for vehicles, such as electric bicycles, electric vehicles, or hybrid electric vehicles and as a power source for industrial and domestic equipment.

BRIEF DESCRIPTION OF THE DRAWINGS

The above and other objects, features and other advantages of the present invention will be more clearly understood from the following detailed description taken in conjunction with the accompanying drawings, in which.

Figure 1:
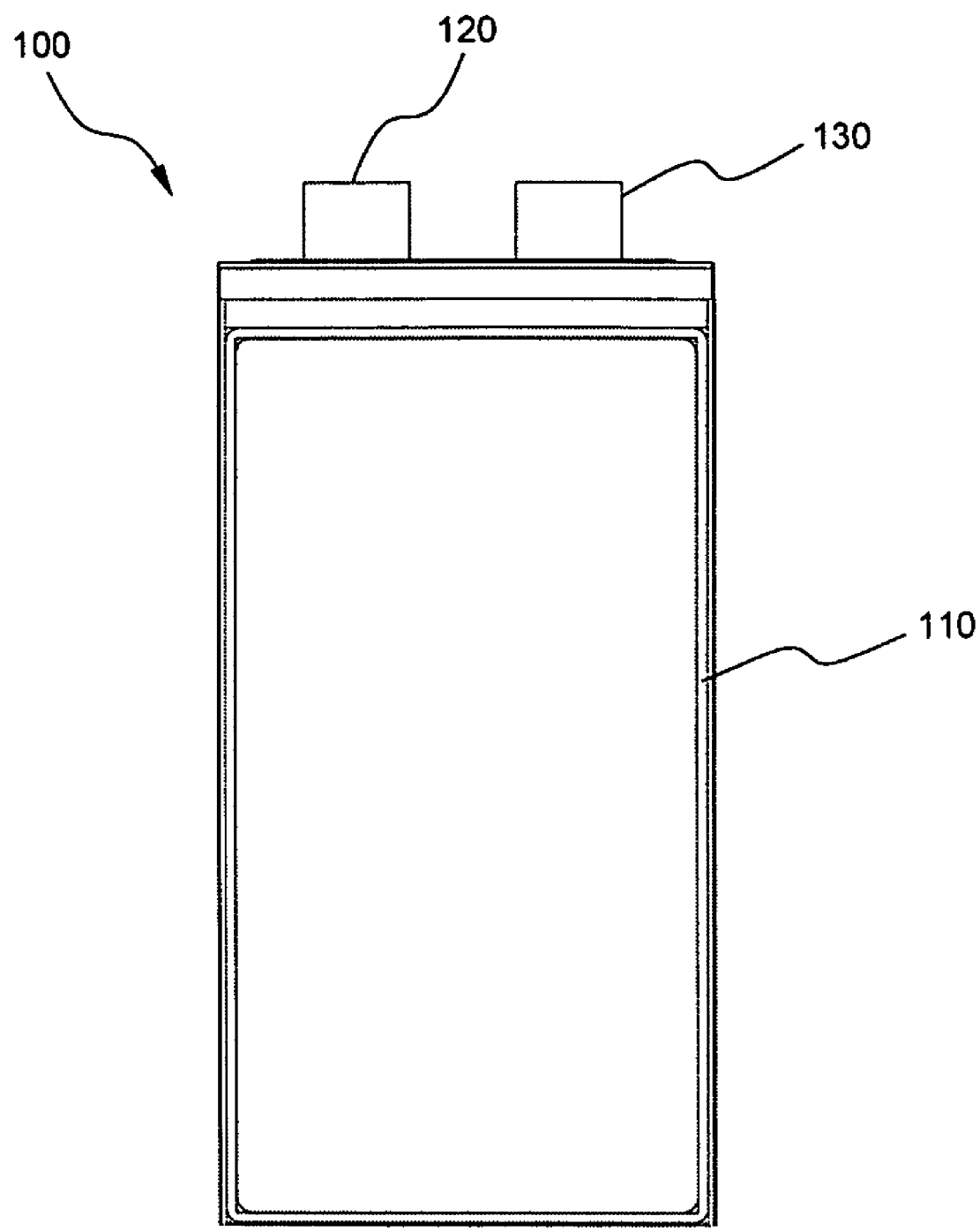
FIG. 1 is a typical plan view illustrating a conventional pouch-shaped cell.

<Description of Main Reference Numerals of the Drawings>

| | |
|---|---|
| 100: | unit cell |
| 110: | cell case |
| 120, 130: | electrode terminals |
| 140: | through-holes |
| 200: | battery module |
| 210: | lower case |
| 220: | upper case |
| 230: | first circuit unit |
| 240: | second circuit unit |
| 250: | third circuit unit |
| 300: | insulating member |
| 400: | fasteners |
| 500: | double-sided adhesive tapes |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 2:
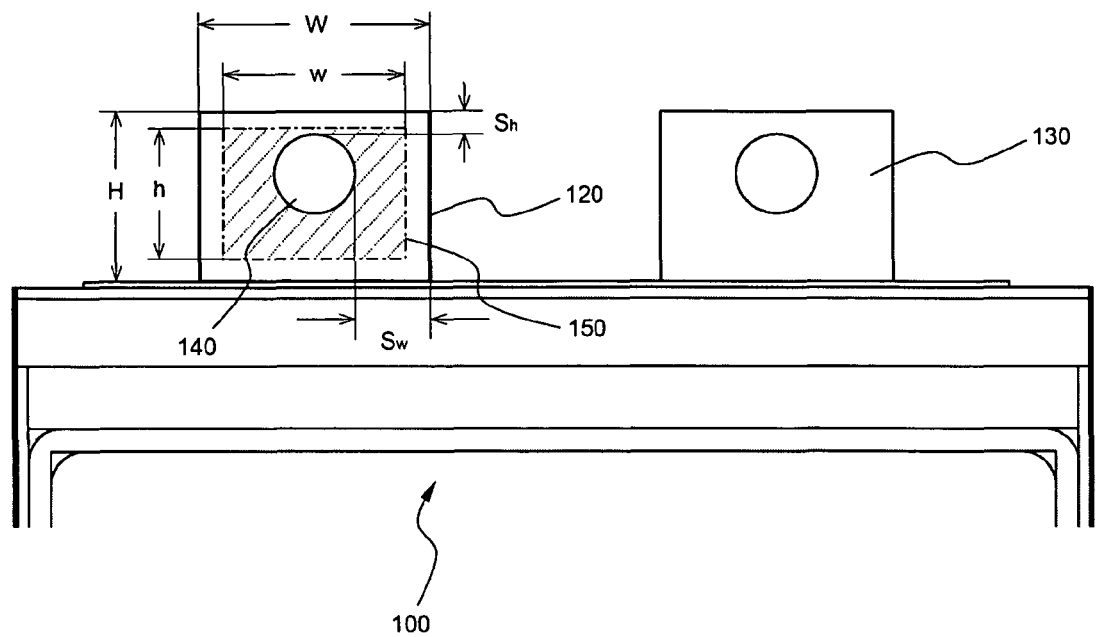
FIG. 2 is a partially enlarged view illustrating a unit cell having through-holes formed at electrode terminals thereof according to a preferred embodiment of the present invention.

FIG. 2 is a partially enlarged view illustrating a unit cell 100 having through-holes formed at electrode terminals thereof according to a preferred embodiment of the present invention.

Referring to FIG. 2, a cathode terminal 120 and an anode terminal 130 are formed at the upper end of the unit cell 100. At the respective electrode terminals 120 and 130 are formed coupling through-holes 140.

The coupling through-hole 140 is located within a critical imaginary area 150 of the electrode terminal 120. The critical imaginary area 150, within which the through-hole 140 is located, is an area defined by a width w corresponding to 80% of the width W of the electrode terminal 120 and a height h corresponding to 80% of the height H of the electrode terminal 120. Also, the separation distances between the outermost boundary line of the through-hole 140 and the outer edges of the electrode terminal 120, i.e., the separation width Sw and the separation height Sh, are 3 mm or more.

Under the above-specified condition, the through-hole 140 can be formed anywhere within the critical imaginary area 150. Preferably, as shown in FIG. 2, the through-hole 140 is formed at the middle of the width W of the electrode terminal 120.

Also, the area of the through-hole 140 is below 70% of the area (W×H) of the electrode terminal 120, preferably, below 50% of the area (W×H) of the electrode terminal 120.

FIGS. 3A to 3F are views illustrating various shapes of the through-hole 140 that can be formed at the electrode terminal 120 according to the present invention.

Figure 3:
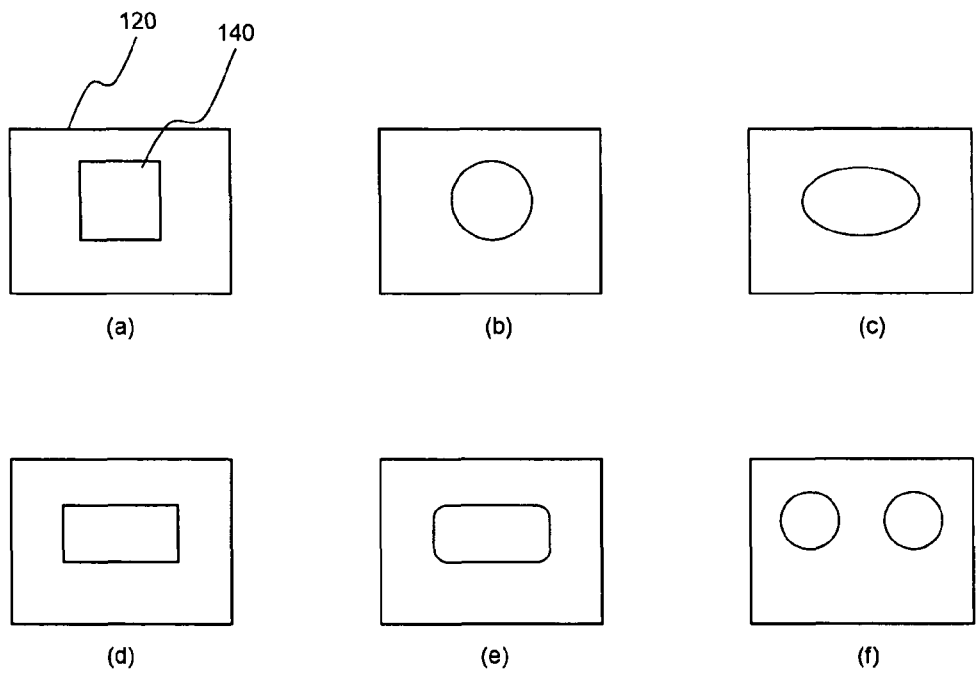
FIGS. 3A to 3F are views illustrating various shapes of the through-hole that can be formed at each electrode terminal according to the present invention.

Referring to FIGS. 3A to 3F, the through-hole 140 may be formed in the shape of a square (FIG. 3A), a circle (FIG. 3B), an oval (FIG. 3C), a rectangle (FIG. 3D), or a rounded rectangle (FIG. 3E). However, the through-holes 140 may be formed in any other shapes. The number of the through-holes 140 formed at the electrode terminal 120 is one, as shown in FIGS. 3A to 3E. However, the number of the through-holes 140 formed at the electrode terminal 120 may be two, as shown in FIG. 3F, or more.

Figure 4:
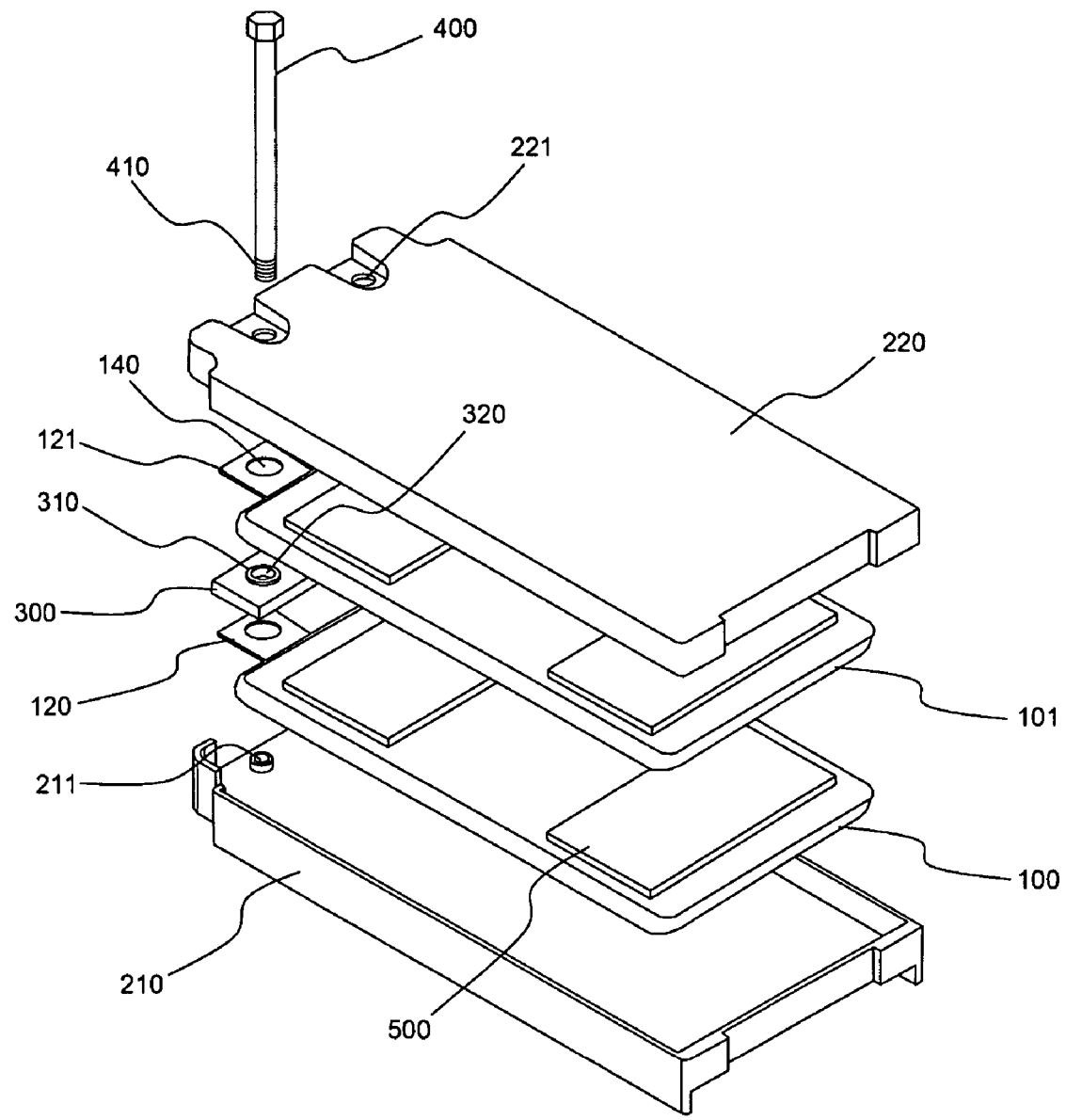
FIG. 4 is a typical perspective view illustrating a process for preparation of a battery module accomplished by coupling unit cells with each other through the connection between electrode terminals having through-holes according to a preferred embodiment of the present invention.

FIG. 4 is a typical perspective view illustrating a process for preparation of a battery module 200 accomplished by coupling unit cells with each other through the connection between electrode terminals having through-holes according to a preferred embodiment of the present invention.

Referring to FIG. 4, unit cells 100 and 101 are stacked one on another between a lower case 210 and an upper case 220, which are separated from each other, of the battery module 200 according to the present invention such that the electrode terminals 120 and 121 of the unit cells 100 and 101 are arranged in the same orientation. Between the electrode terminals 120 and 121 are disposed an insulating member 300 for maintaining the electrical insulation between the electrode terminals 120 and 121. At the insulating member 300 is formed a protrusion 310, which is fitted in the though-hole 140 of the electrode terminal 120. At the center of the protrusion 310 is also formed a through-hole 320 having a small diameter.

At the upper ends of the lower case 210 and the upper case 220, which have a size sufficient to receive the unit cells 100 and 101, are also formed through-holes 211 and 221, which correspond to the through-hole 320 of the protrusion 310. The inner diameters of the through-holes 211 and 221, which are formed at the lower and upper cases 210 and 220, respectively, are approximately equal to that of the through-hole 320 formed at the insulating member 300. On the other hand, the inner diameter of the through-hole 140, which is formed at the electrode terminal 120 is greater than those of the through-holes 211, 221, and 320, and is approximately equal to the outer diameter of the protrusion 310.

The unit cells 100 and 101 are stacked on the lower case 210, while the insulating member 300 is disposed between the unit cells 100 and 101, such that the through-holes 221, 140, and 211 are aligned with each other, and then the stacked unit cells 100 and 101 are covered by the upper case 220. Subsequently, a coupling member, for example, a fastener 400, is inserted through the through-holes 221, 140, 211 to couple the unit cells 100 and 101 with each other. A nut (not shown) may be threadedly engaged with a threaded part 410 formed at the lower end of the fastener 400 from the lower surface of the lower case 210, whereby more secure coupling between the unit cells 100 and 101 is accomplished.

The coupling between the two unit cells 100 and 101 is typically illustrated in FIG. 4. However, the number of the unit cells may be varied depending upon the capacity and the output of the battery module 200.

The electrode terminals 120 and 121 may be connected in series or in parallel with each other by a conductive connecting member (not shown), which is connected to the insulating member 300. The connecting member may be formed in various structures. Since the conductive connecting member is directly connected to the insulating member 300, the electrical connection between the connecting member and the electrode terminals 120 and 121 are easily accomplished due to the physical contact therebetween. According to circumstances, the contact region may be welded to increase the coupling force between the connecting member and the electrode terminals 120 and 121.

Two double-sided adhesive tapes 500 are attached to the upper surface of a cell case of the unit cell 100, whereby more stable coupling between the stacked unit cells 100 and 101 is guaranteed. Furthermore, the stacked unit cells 100 and 101 are spaced apart from each other by the thickness of the double-sided adhesive tapes 500. The gap between the stacked unit cells 100 and 101 serves to absorb the change in volume of the unit cells 100 and 101 while the unit cells 100 and 101 are charged or discharged and to effectively dissipate heat generated from the unit cells 100 and 101 while the unit cells 100 and 101 are charged or discharged.

Figure 5:
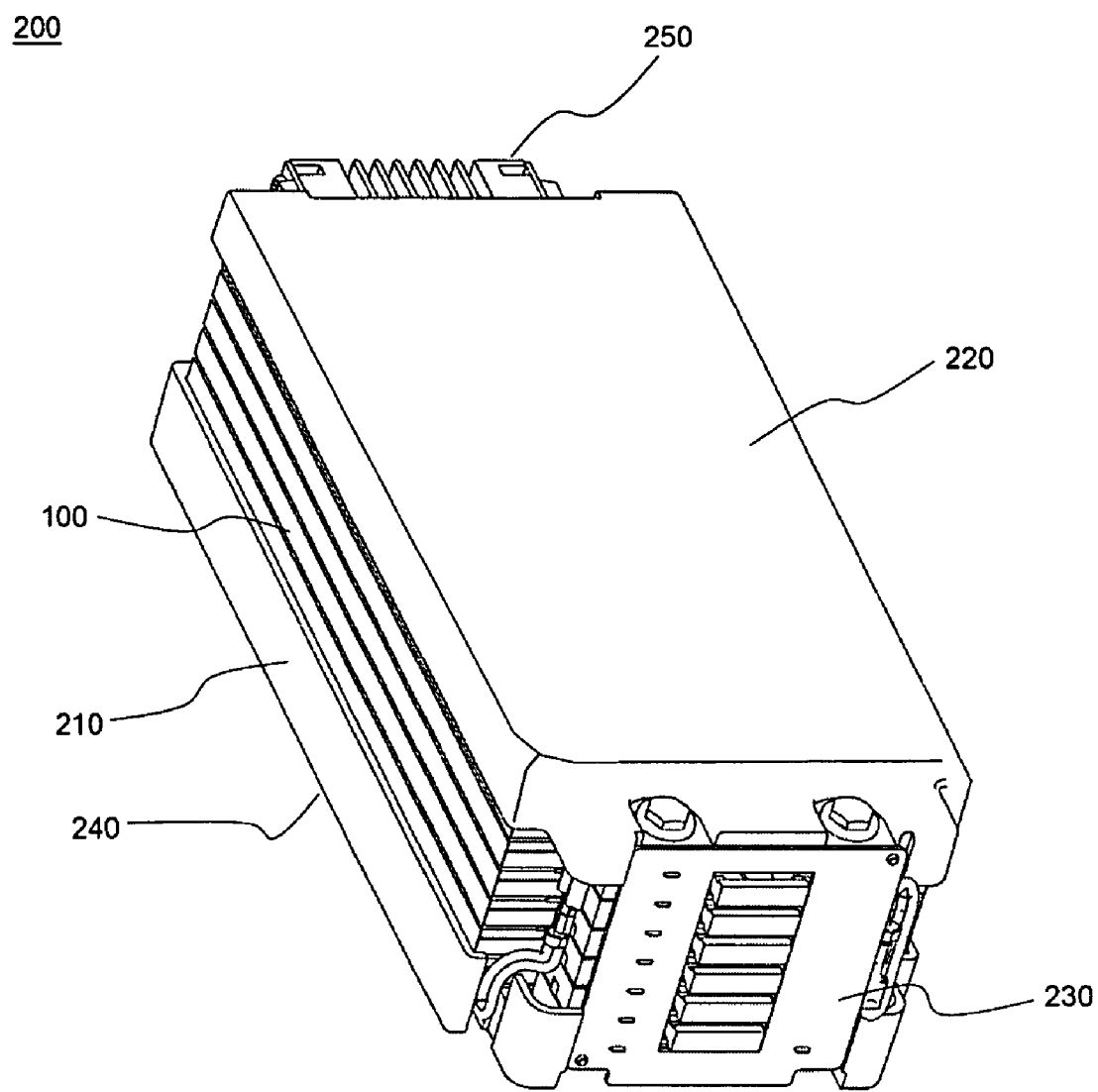
FIG. 5 is a perspective view illustrating a battery module prepared according to a preferred embodiment of the present invention.

FIG. 5 is a perspective view typically illustrating a battery module 200 prepared according to a preferred embodiment of the present invention.

Referring to FIG. 5, the battery module 200 includes an upper case 220, a lower case 210, a plurality of unit cells 100, a first circuit unit 230, a second circuit unit 240, and a third circuit unit 250. The unit cells 100 are stacked one on another between the upper case 220 and the lower case 210, which are separated from each other. The first circuit unit 230 is mounted at the front surface of the battery module 200, the second circuit unit 240 is mounted at the lower surface of the battery module 200, and the third circuit unit 250 is mounted at the rear surface of the battery module 200.

Since the upper case 220 and the lower case 210 are separated from each other, the number of the unit cells 100, which are stackable one on another, is not limited by the upper case 220 and the lower case 210. Consequently, it is possible to easily design the battery module 200, such that the battery module 200 has desired electrical capacity and output, by modifying the first circuit unit 230 and the third circuit unit 250 depending upon the number of the stacked unit cells 100. Also, the unit cells 100 are exposed, and therefore, heat dissipation is efficiently accomplished while the unit cells 100 are charged or discharged.

The first circuit unit 230 is mounted at one side surface of the battery module 200 adjacent to electrode terminals of the unit cells 100. The first circuit unit 230 includes a terminal connecting member for connecting the unit cells 100 in parallel or in series with each other and a sensing board assembly for receiving voltage and current signals from the respective unit cells 100 and sensing the temperature of the respective unit cells 100.

The second circuit unit 240 is electrically connected to the first circuit unit 230. The second circuit unit 240 includes a main board assembly for controlling the battery module 200. The second circuit unit 240 is mounted in a lower receiving part of the lower case 210.

The third circuit unit 250 is electrically connected to the second circuit unit 240. Also, the third circuit unit 250 is connected to an external output terminal while preventing overcurrent during charging and discharging electricity. The third circuit unit 250 is mounted at the other side surface of the battery module 200 such that the third circuit unit 250 is opposite to the first circuit unit 230.

With the above-stated construction, the secure coupling and the electrical connection between the unit cells are accomplished without using additional members, such as cartridges. Also, the circuit units are successively mounted at the sides of the battery module. Consequently, the battery module is prepared in a compact structure and with high coupling force.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the coupling through-holes having specific shapes are formed at the electrode terminals protruding from the cell bodies of the unit cells, and the coupling members are inserted through the coupling through-holes. As a result, the battery module can be prepared while the plurality of unit cells are securely coupled with each other in the battery module without using conventional cartridges, and the electrical connection between the unit cells is easily accomplished. The battery module according to the present invention can be variously utilized as a battery module for medium- or large-sized devices, such as electric bicycles, electric vehicles, and hybrid electric vehicles.

What is claimed is:

1. A process for preparation of a secondary battery module, comprising the steps of:
    forming coupling through-holes in plate-shaped electrode terminals of a plurality of unit cells, in which a cathode terminal and an anode terminal comprising the plate-shaped electrode terminals are formed at an upper end of the unit cells;
    stacking the unit cells one on another; and
    inserting coupling members through the coupling through-holes to couple the unit cells with each other, wherein
    each of the coupling through-holes is located within a critical imaginary area defined by a width corresponding to 80% of the width of the corresponding electrode terminal and a height corresponding to 80% of the height of the corresponding electrode terminal, and
    the separation distance between the outermost boundary line of each of the through-holes and at least one of the outer edges of each of the electrode terminals is 3 mm or more,
    wherein the battery module includes
    an insulating member mounted between the electrode terminals of the neighboring unit cells for maintaining electrical insulation between the electrode terminals, the insulating member having coupling protrusions, which are fitted in the through-holes; and
        a connecting member coupled to the insulating member for electrically connecting the electrode terminals of the unit cells coupled to the insulating member in series or in parallel with each other,
        wherein the coupling protrusions are also provided with through-holes having an inner diameter less than that of the through-holes of the electrode terminals;
        the unit cells are stacked on one another while the insulating member is disposed between the neighboring unit cells, and the coupling members are inserted through the through-holes of the coupling protrusions, whereby the unit cells are coupled with each other; and
        two double-sided adhesive tapes, which couple neighboring unit cells, are attached to an upper surface of a cell case of the unit cells, are spaced apart from each other, and the stacked unit cells are spaced apart from each other by a thickness of the double-sided adhesive tapes, whereby a stacked structure of the unit cells is stably maintained.

2. The process as set forth in claim 1, wherein the unit cells are lithium secondary cells.

3. The process as set forth in claim 1, wherein the unit cells are pouch-shaped cells.

4. The process as set forth in claim 1, wherein each of the through-hole has an area less than 60% of that of the corresponding electrode terminal.

5. The process as set forth in claim 1, wherein each of the through-hole has an area less than 40% of that of the corresponding electrode terminal.

6. The process as set forth in claim 1, wherein each of the through-holes is formed in the shape of a circle or an oval, the outermost boundary surface of which is closed.

7. A high-output, large-capacity secondary battery module prepared by coupling a plurality of unit cells with each other and electrically connecting the plurality of unit cells to each other using the process as set forth in claim 1.

8. The battery module as set forth in claim 7, wherein the battery module comprises:
    a plate, on which the plurality of unit cells, which are chargeable and dischargeable secondary cells, are stacked one on another; and
    circuit units for controlling the operation of the battery.

9. The battery module as set forth in claim 8, wherein the battery module comprises:
    the plurality of unit cells, which are chargeable and dischargeable secondary cells;
    a rectangular lower case having a lower receiving part, to which a main board assembly is attached, and an upper receiving part, on which the unit cells are sequentially stacked one on another;
    a rectangular upper case having a lower receiving part for covering the upper end of the unit cells stacked on the lower case;
    a first circuit unit for performing the electrical connection between the stacked unit cells, the first circuit unit including a sensing board assembly for sensing the voltage, the current, and the temperature of the battery, the first circuit unit being mounted at one side surface of the battery module adjacent to the electrode terminals of the unit cells;
    a second circuit unit electrically connected to the first circuit unit, the second circuit unit including a main board assembly for controlling the battery module, the second circuit unit being mounted in the lower receiving part of the lower case; and
    a third circuit unit electrically connected to the second circuit unit, the third circuit unit also being connected to an external output terminal while preventing overcurrent, the third circuit unit being mounted at the other side surface of the module such that the third circuit unit is opposite to the first circuit unit.

* * * * *